Feb. 22, 1949. G. KOEHLER 2,462,751
SPEED CONTROL FOR INDUCTION MOTORS
Filed Jan. 18, 1946 2 Sheets-Sheet 1
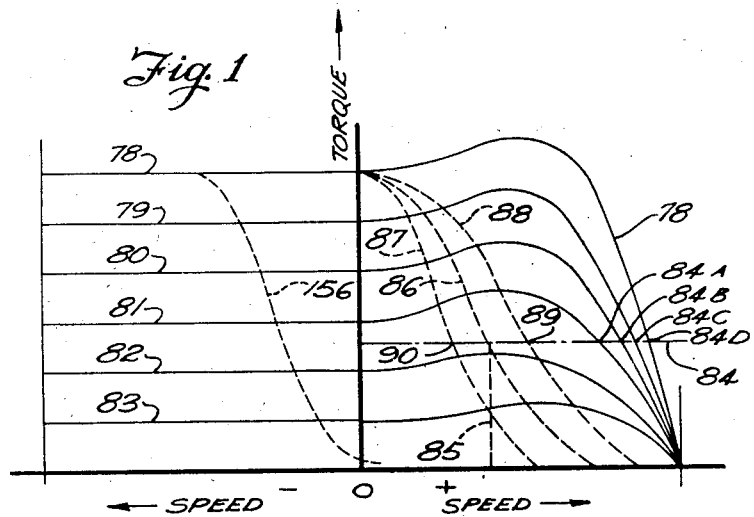
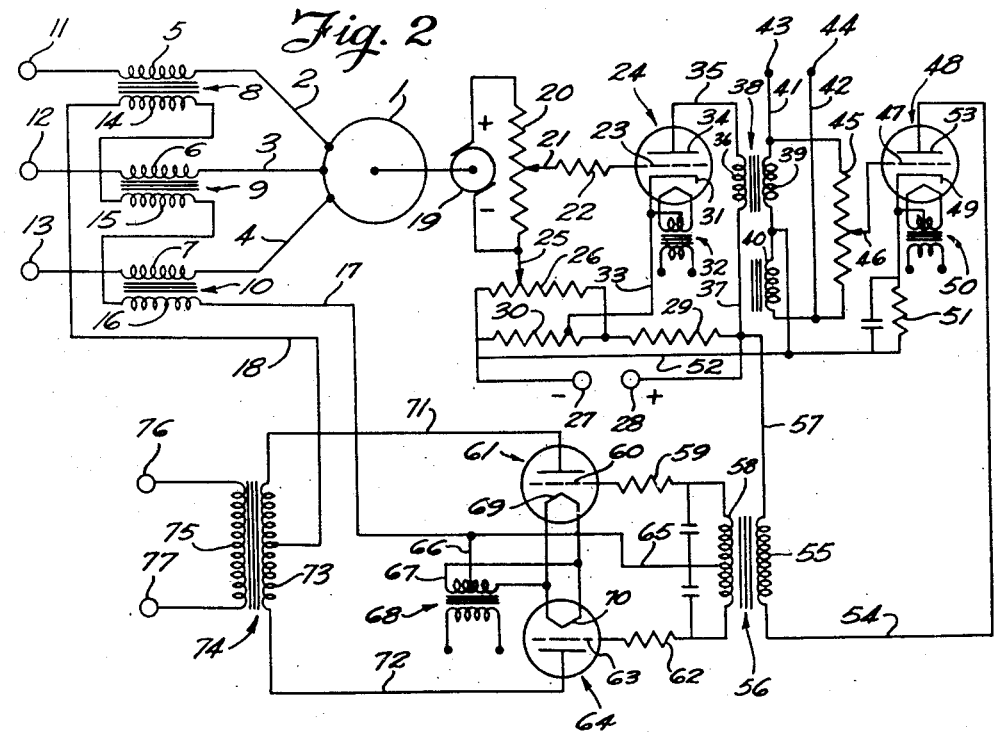
INVENTOR
Glenn Koehler
BY
David A. Fox
ATTORNEY Feb. 22, 1949.                    G. KOEHLER                    2,462,751
                        SPEED CONTROL FOR INDUCTION MOTORS
Filed Jan. 18, 1946                                        2 Sheets-Sheet 2
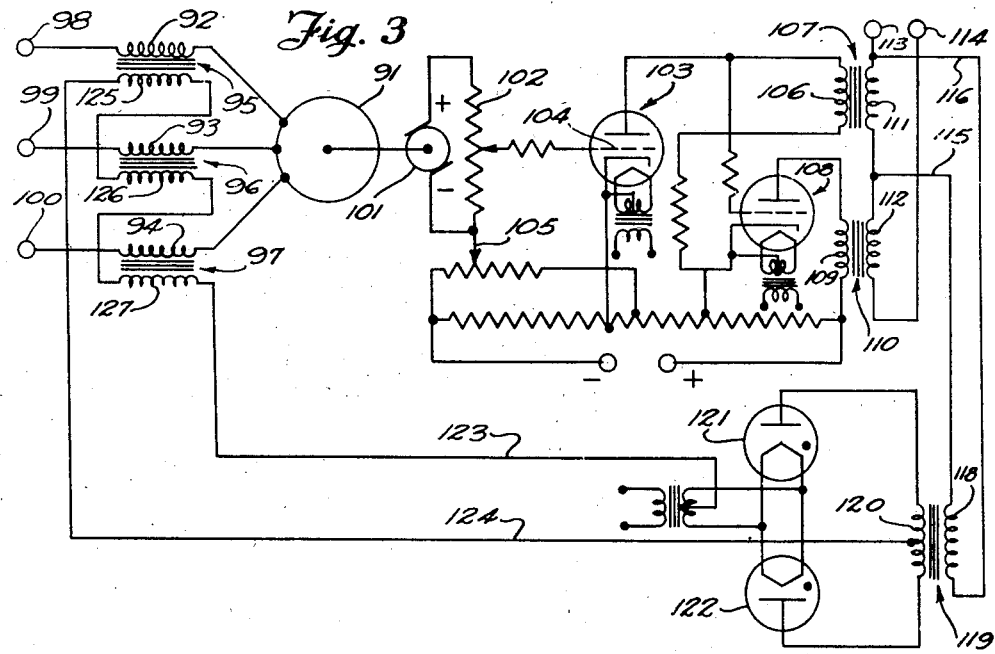
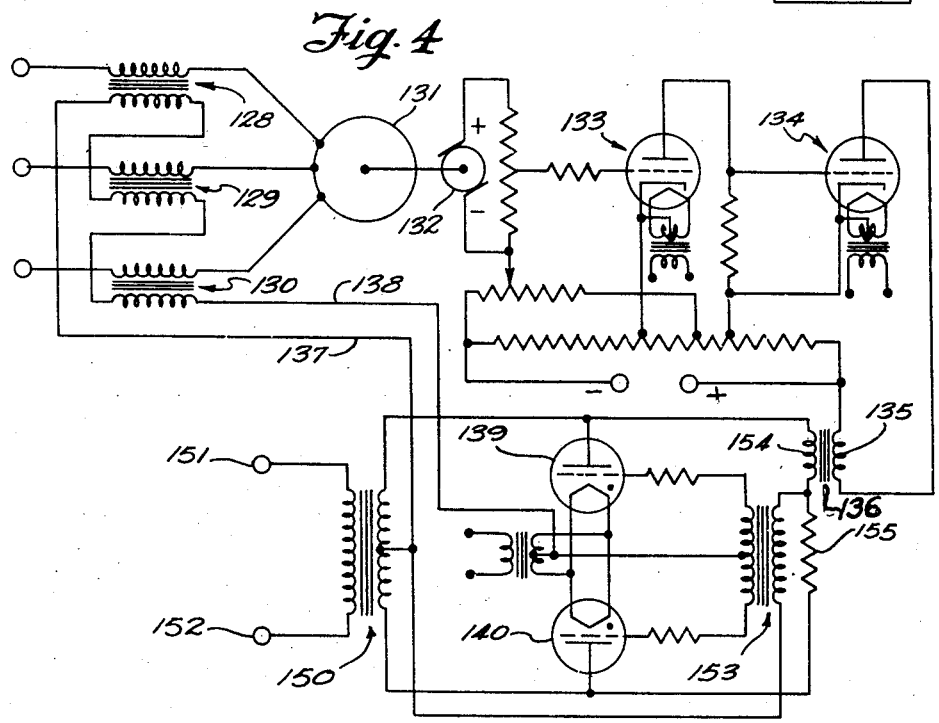
INVENTOR
Glenn Koehler
BY
David A. Fox
ATTORNEY Patented Feb. 22, 1949

2,462,751

UNITED STATES PATENT OFFICE 2,462,751

SPEED CONTROL FOR INDUCTION MOTORS

Glenn Koehler, Madison, Wis.

Application January 18, 1946, Serial No. 642,078

7 Claims. (Cl. 318—229)

This invention relates to control means for alternating current electric motors, by means of which, the load and speed characteristics of such a motor are so related as to permit speed control and regulation and maintenance of any adjusted speed within moderate limits of fluctuation in spite of appreciable variations in load. More specifically the invention resides in a circuit arrangement adapted to be associated with an alternating current motor and includes a generator adapted to be mechanically connected to said motor to be driven thereby so as to have an output potential which is a function of said motor speed, said output potential being availed of, without imposition of substantial load, to regulate in a manner subject to external adjustment, a current gate through which load current is supplied to said motor, said current gate preferably comprising saturation regulated impedance means arranged to be excited by amplifying means responsive to the potential output of said generator, said saturation regulated impedance means being interposed in the entrance mains of said motor.

Heretofore alternating current translating devices such as motors have been ill-adapted for services where regulation of speed has been called for, and even in the case of speed control obtained through adjustment of secondary resistance in wound rotor induction motors much has been left to be desired in the way of range of speed adjustment and maintenance of regulated speed under fluctuating load conditions. In an effort to overcome these difficulties a wide variety of structures and circuit arrangements has been proposed and used. The complexity and expense of these has disqualified them for most applications and in their simpler forms they have failed to exhibit the properties required. Through this invention a comparatively simple and inexpensive control arrangement is provided which permits wide adjustment of speed not only under forward drive but also countertorque conditions, and which exhibits over a large part of the load range good regulation of speed in spite of fluctuation of load.

This invention is herein described by reference to the accompanying drawings in which there is set forth by way of illustration and not of limitation forms in which the apparatus of this invention may be embodied.

In the drawings:

Fig. 1 is a graphical representation of the speed-torque characteristics of a hypothetical squirrel cage motor at various applied voltages upon which there is imposed curves illustrating new characteristics introduced into said motor through the application of the control apparatus of this invention;

Fig. 2 is a circuit diagram of one form of the apparatus of this invention applied to a suitable motor;

Fig. 3 is a circuit diagram of another form of the apparatus of this invention employing a somewhat different arrangement for amplifying the output of the pilot generator; and Fig. 4 is a circuit diagram of another form of the apparatus of this invention.

One form of the apparatus of this invention is diagrammatically shown in Fig. 2 where a three-phase induction motor is indicated at 1. The entrance mains 2, 3 and 4 of motor 1 are connected respectively as shown through impedance windings 5, 6 and 7 of saturable reactors 8, 9 and 10 with three-phase alternating current power terminals 11, 12 and 13. Saturable reactors 8, 9 and 10 are provided respectively with saturation windings 14, 15 and 16 connected in series as shown to neutralize transformer effect and joined by leads 17 and 18 with a variable source of direct current to be described in greater detail below. The reactors 8, 9 and 10 also may be of the well known 3 legged type wherein the transformer effect is internally neutralized so that the saturation windings may be connected either in series or parallel as desired. Provision is thus made for balanced regulation of the voltage applied to the terminals of motor 1. In this way the torque exerted by the motor under given load conditions is subject to regulation.

Joined with the shaft of motor 1 to be driven thereby is an armature of a direct current pilot generator 19, provided with steady field excitation, as by a permanent magnet field not shown, or in any other fashion which will cause the no-load output voltage of said generator to be a fairly uniform function of the generator speed. Across the brushes of generator 19 there is connected a resistor 20 of such substantial resistance as to impose no appreciable load upon the generator 19. A movable side tap 21 connected through a grid resistance 22 joins with the control grid 23 of a three-element vacuum tube 24.

Upon forward running of the motor 1 the polarity of the generator 19 is as indicated and the negative end of resistor 20 is connected by means of a movable tap 25 with a grid bias resistor 26. Plate supply and the necessary grid bias potential is provided as shown through terminals 27 and 28 intended to be connected to an appropriate direct current source and through voltage dividing resistors 29 and 30 connected as shown.

The cathode 31 of tube 24 is arranged to be heated in conventional fashion by means of the heater circuit 32 and is connected by means of the lead 33 with the resistor 30 in such relationship that a substantial negative bias is made available at the tap 25 and thus superimposed upon the segment of the potential drop prevailing in the resistor 20 due to the output of generator 19 so that a resultant potential is applied to the grid 23. The plate 34 of the tube 24 is connected by lead 35 with a saturation winding 36 and from thence through the lead 37 to connection with the positive plate supply terminal 28. There is thus provided a direct current amplifying system adapted to cause a current to flow in the winding 36 which is subject to regulation in keeping with the potential applied to the grid 23.

In normal operation it is contemplated that the resistors 26 and 30 be so related with the plate supply applied to the terminals 27 and 28, as to produce a bias on the grid 23, sufficient to cause complete cut-off of plate current when the motor 1 and generator 19 are stationary. A movable tap 25 is arranged for adjustment so as to permit alteration in this applied bias. Upon acceleration of motor 1 the increasing potential drop occurring in resistor 20 begins to overcome the bias prevailing in the grid 23 and thus to cause the tube 24 to become conducting to a degree which is a function of the speed of motor 1.

The winding 36 forms a part of a saturation reactor 38 having an impedance winding 39 which is disposed in bridge relationship with an impedance 40 joined as shown by leads 41 and 42 with terminals 43 and 44 adapted to be supplied with alternating current. Connected across the ends of the bridge formed by the impedances 39 and 40 is a bridge resistor 45 engaged by a movable tap 46 connected with the control grid 47 of a three-element tube 48. With no current flowing in the saturation winding 36 and due to the fact that impedances 39 and 40 are under this condition approximately equal, substantially no alternating potential is applied to the grid 47 assuming the tap 46 to be properly related to the resistor 45. As current flowing through the saturation winding 36 increases, the impedance of winding 39 diminishes, thus upsetting the balance of the bridge relationship and causing an alternating potential to be applied to the grid 47, of an amplitude which is determined by the quantity of current flowing in the saturation winding 36.

The tube 48 is provided with a cathode 49 maintained at proper temperature by suitable cathode heating means 50 and is connected through resistor 51 and lead 52 with the negative supply terminal 27. The plate 53 of the tube 48 is connected through a lead 54 with a transformer primary winding 55 of a transformer 56 and by lead 57 with the positive plate supply terminal 28. By reason of this arrangement an alternating current is applied to the transformer primary 55 at a potential which is a function of the output of generator 19 and hence of the speed of the motor 1.

Transformer 56 is provided with a secondary winding 58 joined at one end through a resistor 59 with a grid 60 of a three-element rectifying tube 61 and at the opposite end through a resistor 62 with a grid 63 of a three-element rectifying tube 64. The mid-point of winding 58 is joined by a lead 65 and a lead 66 with the mid-point of a secondary winding 67 of a cathode heating transformer 68 the latter being connected as shown with the cathodes 69 and 70 of the tubes 61 and 64 respectively.

The plates of tubes 61 and 64 are connected by leads 71 and 72 with the ends of a secondary winding 73 of a plate supply transformer 74 having a primary winding 75 arranged to be connected to alternating current supply terminals 76 and 77. The transformers 56 and 74 are so wound and related that the induced potentials produced upon the grids 60 and 63 by the transformer 56 are in opposite phase to the plate potentials occurring in tubes 61 and 64. By reason of this and of the fact that lead 17 is connected through the lead 66 with the cathodes of tubes 61 and 64 and lead 18 is connected to the mid-point of winding 73, a unidirectional current is caused to flow through the saturation windings 14, 15 and 16 which is an inverse function of the rate of rotation of the motor 1 which function is capable of being altered at will through adjustment of movable tap 25. Thus it will be seen that with any selected position of adjustment of the tap 25, motor 1, being subjected to a predetermined load, will accelerate upon application of power to the terminals 11, 12 and 13 and in so doing will cause, through the generator 19 and succeeding circuit elements, an increase in impedance to occur in windings 5, 6 and 7. Thus the motor 1 will be capable of exerting a continually diminishing torque as it accelerates until such torque equals that imposed by the load whereupon the speed will become steady.

The characteristics exhibited by the motor 1 modified by the control arrangement above described are best explained by reference to Fig. 1 which displays certain representations with respect to a hypothetical squirrel cage induction motor having somewhat greater than customary secondary resistance. The invention, however, is applicable to other forms of alternating current motors such as wound rotor induction motors and commutator type alternating current motors as well. In Fig. 1 the curve 78 represents the torque exerted by the motor 1 plotted against the speed of the motor for all speeds from synchronous speed at the extreme right down through zero speed to minus synchronous speed under overhauling load or countertorque conditions at the left, all under the steady application of the full rated voltage of the motor. The curves 79 to 83 successively represent similar torque speed characteristics of the motor 1 under application of steady applied voltages which are successively smaller fractions of full rated voltage. The dot and dash line 84 represents a load which imposes a constant torque regardless of speed, and points of intersection 84A to 84D inclusive, when referred to the speed axis, represent the speed which the motor 1 will assume under this particular load condition with respective applied voltages 78, 79, 80 and 81.

The representations discussed so far are inherent in the motor 1 independently of the control apparatus of this invention and illustrate that speed variation under steady load conditions can be made available by simple regulation of applied voltage. Assuming, however, that under the particular load condition represented by 84 a speed is desired such as is represented by the vertical intercept 85. It will be apparent then that further reduction of applied voltage to a quantity intermediate 81 and 82, for the purpose of attaining speed 85 will produce an unstable torque-speed condition under which the torque exerted by the motor 1 will be almost certain to deteriorate below that imposed by the load 84 so that the motor 1 will have an inherent tendency to stall.

The above difficulty is circumvented by the application of the control of this invention through which the motor 1 is endowed with an externally imposed response which is equivalent to new and different speed-torque characteristics. In accordance with this invention the torque exerted by the motor 1 is caused to vary inversely with its speed not only in its upper speed ranges but in its lower speed ranges also. This follows since reduction in speed of the motor 1 causes generator 19 and succeeding circuit elements to influence the saturation reactors 8, 9 and 10 as above explained to produce a sufficient voltage increase to entirely overcome the torque drop which would otherwise occur on drop in speed under steady applied voltage. As illustrative of the general character of this new response the broken curve 86 is shown, the same representing the torque exerted by the motor 1 at various speeds when under the influence of the control of this invention with the contact 25 in one adjusted position. It will be apparent from the disposition of curve 86 that speed stability at speed 85 will be maintained under the load condition 84 when the motor 1 is thus controlled and there will be no tendency of the motor to stall.

The particular curve 86 presupposes a position of adjustment of movable contact 25 such as just to meet the speed-load condition 85—84; but for every speed-load condition within the operative range enclosed by the curve 78, there is a position of adjustment for the contact 25 which will cause the motor to exert the torque required at the speed to be established. In effect, movement of the contact 25 generates a family of response curves of which 86, 87 and 88 are part of the members. Thus it may be seen that under the load 84, movement of 25 to the right will result in the lowering of speed, for example to the point 90, while movement of 25 to the left will result in an increase in speed, for example to the point 89.

By reason of the relatively high slopes of the curves of the family represented by 86, 87 and 88 over the bulk of the operating range of the motor 1, good speed regulation under variable load is obtained. Furthermore, by proper selection of characteristics in generator 19 or in the succeeding amplifying elements, or both, the family of curves 86, 87 and 88 can be made nearly vertical over a good part of its mid ranges with the result that not only speed control but great steadiness of speed regulation under widely fluctuating load can be obtained within this mid range. An additional advantage is that the above is accomplished in a polyphase motor without upsetting the balance of the several phase circuits and without creation of excessive rotor currents.

One of the special fields of advantage of the control of this invention is that of the control of motors used for the handling of overhauling loads as in the case of cranes and hoists where the control of speed of both hoisting and lowering is required. In this case during lowering the motor 1 may be employed under countertorque conditions and when so operating, polarity of generator 19 is reversed. Thus upon acceleration the degree of torque exerted by the motor 1 increases to discourage such acceleration; conversely, if deceleration occurs during lowering, the countertorque exerted by the motor 1 diminishes to prevent loss of lowering speed. Thus by selection of the proper position of adjustment for the contact 25 various steady lowering speeds under various load conditions may be established and maintained. For example, under countertorque conditions adjustments may be chosen which will give a family of characteristics one of which is represented by the curve 156.

For convenience, ready means for controlling the position of contact 25 is preferably made available at an operator's control station so that means for control of the speed of the motor 1 is made available through manipulation of this control. However, it is apparent that adjustment of contacts 21 and 46 may also be resorted to as direct or ancillary means for accomplishing the same or similar ends.

The circuit arrangement shown in Fig. 2 is better adapted for control of motors of relatively small horsepower and is not preferred for larger motors because of the difficulty of obtaining three-element vacuum tubes 61 and 64 of large enough capacity. To conveniently overcome this limitation a circuit such as is shown in Fig. 3 may be employed. In the circuit shown in Fig. 3 a motor 91 is shown connected through impedance windings 92, 93 and 94 of saturation reactors 95, 96 and 97 with supply terminals 98, 99 and 100. As in the circuit shown in Fig. 2 motor 91 is mechanically connected with the armature of a pilot generator 101 across the brushes of which is connected a resistor 102. In a manner similar to that described above an amplifying tube 103 having a grid 104 arranged to be adjusted as to its bias by movable contact 105 is arranged to apply its plate current to a saturation winding 106 of a saturation reactor 107. An additional vacuum tube 108 connected as shown is arranged to be controlled through grid potential derived from the plate circuit of tube 103. In this way the plate current of tube 108 varies inversely with that of tube 103 and the plate current of tube 108 is applied as shown to the saturation winding 109 of saturation reactor 110.

The impedance winding 111 of saturation reactor 107 and the impedance winding 112 of the saturation reactor 110 are connected in series and are supplied from an alternating current source through the terminals 113 and 114. As motor 91 accelerates and the output of generator 101 increases the impedance of winding 111 diminishes while that of winding 112 increases accordingly. Shunted across the ends of winding 111 by means of leads 115 and 116 is the primary winding 118 of a transformer 119. The secondary winding 120 is connected as shown through two-element gas filled rectifier tubes 121 and 122 and the leads 123 and 124 with the saturation windings 125, 126 and 127. In this way with the motor 91 at a standstill the drop across winding 111 is a maximum with the result that maximum voltage is applied to the transformer 119 and from thence to the rectifiers 121 and 122 to the saturation windings of the saturation reactors 95, 96 and 97. Thus full rated voltage is applied to the motor 91. As the motor accelerates the excitation of the saturation reactors 95, 96 and 97 diminishes and the impedance of the same increases with the result that there is superimposed upon the motor 1 a response which is parallel in all respects with that described in connection with the motor 1. By reason of the higher capacity of gas filled rectifier tubes such as 121 and 122 this circuit is adapted for the control of larger motors than that illustrated in Fig. 2.

If desired, other rectifier means than gas filled two-element tubes may be employed such as dry disc rectifiers and the like.

A still further form of the apparatus of this invention is illustrated in Fig. 4. In this case saturation reactors 128, 129 and 130 are interposed in the entrance leads of a motor 131 which is mechanically connected to a pilot generator 132. The generator 132 is connected through a first stage of direct current amplification 133 to a second stage of direct current amplification 134 as shown. The output of amplification stage 134 is applied in turn to a saturation winding 135 of a saturation reactor 136.

Connected to supply excitation current to the saturation reactors 128, 129 and 130 by means of leads 137 and 138 is a pair of gas filled grid control three-element rectifier tubes 139 and 140. Tubes 139 and 140 are arranged to be supplied with power by a transformer 150 connected to terminals 151 and 152 the latter being adapted to be connected to an alternating supply source as shown. For excitation of the grids of tubes 139 and 140 a transformer 153 is provided. The primary winding of transformer 153 is connected between the mid-point of the secondary winding of transformer 150 and the mid-point between the impedance 154 of saturation reactor 136 and the fixed resistance 155. In this way with saturation reactor 136 saturated the grids of tubes 139 and 140 are excited in phase with the alternating current plate potentials of these tubes respectively. With saturation reactor 136 excited at less than its full degree of saturation the excitation of the grids of tubes 139 and 140 is caused to lag behind the alternating current plate voltage of the tubes 139 and 140. To the extent that this lag occurs the tubes 139 and 140 are caused to conduct over a smaller part of the phase cycle during which they would otherwise be conducting and hence the rectified output thereof is diminished.

Since the saturation reactor 136 becomes more and more unsaturated as motor 131 accelerates, the applied voltage of motor 131 is reduced as its speed increases. In this way a response is superimposed upon the motor 131 which is quite similar to that described in connection with the other forms of apparatus herein described.

I claim:

1. In an apparatus adapted for association with an alternating current motor to control the speed thereof the combination comprising a direct current pilot generator adapted to be connected to the shaft of an alternating current motor to be mechanically driven thereby and having an output which increases as a function of its speed of rotation with a polarity determined by the direction of said rotation, amplifying circuit means connected to the output of said pilot generator and controlled thereby and adapted to supply current in substantial amount in inverse proportion to said pilot generator output when said motor and generator are running in forward direction and in direct proportion to said pilot generator output when running in reverse direction, and saturation reactor means having impedance windings adapted to be interposed in the entrance mains of a motor to be controlled and having saturation windings operative when excited to diminish the effective impedance of said impedance windings connected to said amplifying circuit means to be excited by the current supplied thereby.

2. In an apparatus adapted for association with an alternating current motr to adjustably control the speed thereof the combination comprising a direct current pilot generator adapted to be connected to the shaft of an alternating current motor to be mechanically driven thereby and having an output which increases with increase in its speed with a polarity determined by its direction of rotation, adjustable amplifying circuit means connected to the output of said pilot generator and controlled thereby and adapted to supply current in substantial amount subject to external adjustment and in inverse proportion to said pilot generator output when running in forward direction and in direct proportion when running in reverse direction, and saturation reactor means having impedance windings adapted to be interposed in the entrance mains of a motor to be controlled and having saturation windings operative when excited to diminish the effective impedance of said impedance windings connected to said amplifying circuit means to be excited by current supplied thereby.

3. In an apparatus adapted for association with an alternating current motor to adjustably control the speed thereof the combination comprising a direct current pilot generator adapted to be connected to the shaft of an alternating current motor to be driven thereby and having a minimum load output voltage approximately proportional to its speed of polarity determined by the direction of its rotation, a shunt resistor connected across the output terminals of said pilot generator of a resistance to impose a minimum load thereon, a vacuum tube amplifier having an initial amplifying tube including a control grid, adjustable tap connections between said shunt resistor and said amplifier and the control grid of said initial amplifying tube adapted to cause the output of said amplifier to diminish as the output of said pilot generator increases when running in forward direction and to increase as the output of said pilot generator increases when running in reverse direction, and saturation reactor means adapted to be interposed in the supply mains of said alternating current motor and having saturation windings operative when excited to diminish the reactance thereof connected to the output of said amplifier.

4. In an apparatus adapted for association with an alternating current motor to adjustably control the speed thereof the combination comprising a direct current pilot generator adapted to be connected to the shaft of an alternating current motor to be driven thereby and having a minimum load output voltage approximately proportional to its speed and of polarity determined by its direction of rotation, a shunt resistor connected across the output terminals of said pilot generator having a resistance to impose a minimum load thereon, a vacuum tube amplifier having an initial stage comprising a vacuum tube including a control grid normally biased beyond plate current cut off, adjustable tap connections between said resistor and the initial amplifier stage and the control grid thereof, said amplifier including an intermediate stage in the form of a vacuum tube having a control grid excited by alternating potential of standard frequency influenced as to its amplitude by the plate current output of said initial amplifying stage whereby the output thereof is a fluctuating current of amplitude in keeping with the output of said pilot generator, said amplifier also having a final direct current output power stage comprising standard frequency alternating current supplied grid controlled rectifying means the grid control means thereof being connected to the fluctuating current output of said intermediate amplifier stage to diminish the rectified output of said power stage in keeping with the intensity of fluctuating current supplied by said intermediate stage, and saturation reactor means adapted to be connected in the entrance mains of said motor and having saturation windings operative when excited to diminish the reactance thereof connected to the output of said final output power stage of said amplifier.

5. In an alternating current motor speed control a direct current pilot generator adapted to be driven by a motor to be controlled having an output the polarity of which is determined by the direction of rotation thereof, amplifying means connected to said pilot generator for amplifying variations in output thereof including alternating current supplied gas filled rectifying means having an output regulated by the output of said pilot generator in inverse proportion thereto when running in the forward direction and in direct proportion thereto when running in reverse direction, and saturation reactor means adapted to be interposed in the entrance mains of said motor and having saturation windings operative when excited to diminish the reactance thereof connected to the output of said amplifier.

6. In an apparatus adapted to be associated with a polyphase alternating current motor for controlling the speed thereof the combination comprising a saturation controllable variable impedance winding adapted to be interposed in each entrance main of a polyphase motor to be controlled, a winding for each saturation controllable variable impedance for adjustably regulating the degree of saturation thereof, a variable saturation current source connected to said saturation winding adapted to excite the same variably and substantially equally in response to a variable pilot potential applied thereto, a pilot potential source adapted to be mechanically connected to said motor to be driven thereby and to create a pilot potential proportional to said motor speed of a polarity determined by the direction of rotation thereof, and means connecting said pilot potential source to said controllable saturation current source for causing the latter to supply saturation current in amount inversely proportional to the speed of said motor when running in the forward direction and directly proportional to said motor speed when running in reverse direction whereby the speed of said motor under predetermined load is controlled without excessive rotor current.

7. In an apparatus adapted to be associated with a polyphase alternating current motor for adjustably controlling the speed thereof the combination comprising a saturation controllable variable impedance winding adapted to be interposed in each entrance main of a polyphase motor to be controlled, a winding for each saturation controllable variable impedance for adjustably regulating the degree of saturation thereof, a variable saturation current source connected to said saturation windings adapted to excite the same variably and substantially equally in response to a variable pilot potential applied thereto, a pilot potential source adapted to be mechanically connected to said motor to be driven thereby and to create a pilot potential proportional to said motor speed of polarity determined by the direction of rotation of said motor, means connecting said pilot potential source to said controllable saturation current source for causing the latter to supply saturation current in amount inversely proportional to the speed of said motor when running in the forward direction and directly proportional to said motor speed when running in reverse direction, and means interposed in said means connecting said pilot potential source and said saturation current source adapted to be externally adjusted to vary the intensity of said pilot potential whereby the speed of said motor may be adjusted and controlled under predetermined load without excessive rotor current.

GLENN KOEHLER.

REFERENCES CITED

The following references are of record in the file of this patent:

UNITED STATES PATENTS

| Number | Name | Date |
| --- | --- | --- |
| 1,353,815 | Meyer | Sept. 21, 1920 |
| 1,871,689 | Higbee | Aug. 16, 1932 |
| 1,894,562 | Jansen et al. | Jan. 17, 1933 |
| 2,102,911 | Perry | Dec. 21, 1937 |
| 2,287,459 | Uehling | June 23, 1942 |
| 2,358,103 | Ryder | Sept. 12, 1944 |
| 2,414,430 | Nisbet | Jan. 14, 1947 |